United States Patent [19]

Huizinga et al.

[11] Patent Number: 5,506,407
[45] Date of Patent: Apr. 9, 1996

[54] HIGH RESOLUTION HIGH SPEED FILM MEASURING APPARATUS AND METHOD

[75] Inventors: John S. Huizinga, Dellwood; John J. Costello, III, Afton, both of Minn.

[73] Assignee: Minnesota Mining & Manufacturing Company, St. Paul, Minn.

[21] Appl. No.: 171,106

[22] Filed: Dec. 21, 1993

[51] Int. Cl.⁶ .................................................. G01B 11/06
[52] U.S. Cl. ................................ 250/341.1; 356/381
[58] Field of Search ................................... 250/341, 345, 250/358.1, 359.1, 360.1, 560, 341.7; 356/382, 381; 200/339.01, 339.02, 339.12, 372

[56] References Cited

U.S. PATENT DOCUMENTS

| | | |
|---|---|---|
| 3,737,234 | 6/1973 | Shibata et al. |
| 3,854,044 | 12/1974 | Stay ................................. 250/339.11 |
| 4,623,254 | 11/1986 | Imose ..................................... 250/381 |
| 4,672,196 | 6/1987 | Canino ................................... 250/560 |
| 4,954,719 | 7/1990 | Harris ..................................... 250/560 |

FOREIGN PATENT DOCUMENTS

| | | |
|---|---|---|
| 2252527 | 5/1974 | Germany. |
| 55-186091 | 12/1980 | Japan. |

Primary Examiner—Davis L. Willis
Assistant Examiner—Richard Hanig
Attorney, Agent, or Firm—Patterson & Keough

[57] ABSTRACT

A high speed high resolution solid film measuring apparatus and method uses coherent monochromatic light by passing the coherent monochromatic light through the solid film and referencing the degree of absorption to known or on-line measured reference values. The measuring apparatus and method accounts for difference in clarity and translucency to derive a running analysis of the solid film thickness. Resolution and speed of the measuring apparatus provides for the adaptation of the measuring device to on-line manufacturing systems as part of a feedback control loop through the manufacturing process.

18 Claims, 3 Drawing Sheets

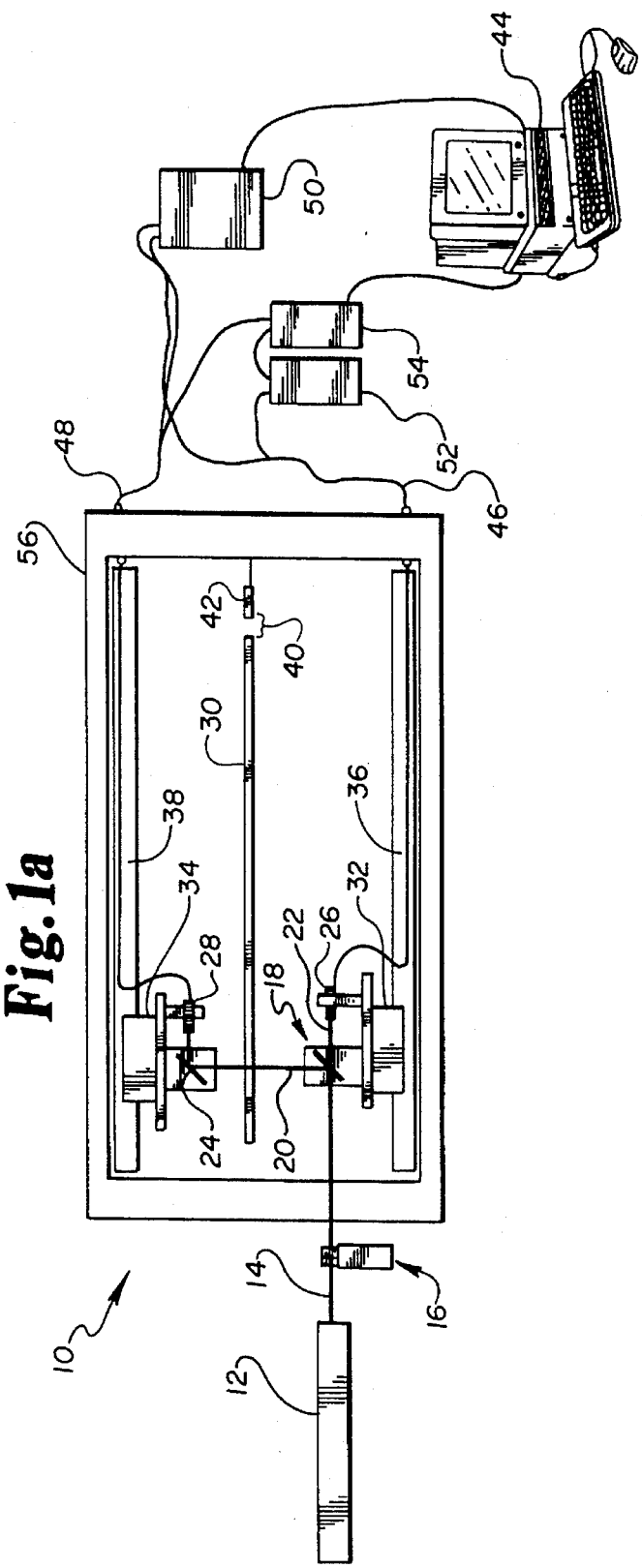
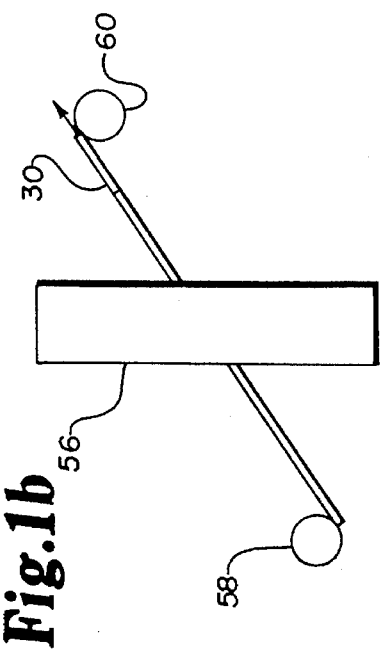
Fig.1a
Fig.1b

HIGH RESOLUTION HIGH SPEED FILM MEASURING APPARATUS AND METHOD

BACKGROUND OF THE INVENTION

1. Field of the Invention

The present invention relates generally to measuring polymer film thickness and more specifically to using coherent monochromatic light to measure polymer film thickness during the manufacturing process.

2. Background of the Invention

Polymer films are used in various product applications requiring different characteristics. These films are formed into films, or webs, of various widths and thicknesses depending upon the use to which they will be put. Some considerations in the manufacture are tensile strength, durability, use as a substrate for other films, ability to be colorized or accept pigments, ability to etched, clarity, and ease of manufacture.

The intended use of the film will generally control the needed thickness of the film. A number of measuring systems including mechanical stylus calipers, beta radiation gauges, filtered broad band light source calipers, x-ray radiation gauges, and gama radiation gauges are available to accomplish these measurements.

Mechanical stylus calipers, although simple in nature, are impractical for use during manufacturing processes. This method uses a sample taken from polymer film stock rolls, measures the thickness of that sample, and relates it back to the stock roll in general. Although accurate, it is a slow process and subject to error secondary to averaging the measurements over the whole stock roll.

Beta radiation gauges have been used to control manufacturing processes but have been found to be exceedingly slow and are fraught with the danger of hazardous emissions of radiation. Beta gauges have been shown to be inaccurate and are limited to the number of electrons that can be fired through the polymer film web. Inaccuracy of beta radiation gauges stems from the assumption that the material is of constant density when converting the basis weight of the polymer film to its caliper.

Filtered broadband light sources are exceedingly inefficient, using light sources that must be filtered to obtain a narrower band width that is useable in measuring polymer film thickness. A considerable amount of energy is wasted in the filtering process which is lost as heat. Despite the narrowing of the band width through the filtering process, the wavelength range is still significantly broad enough to introduce significant error within the measuring system.

X-ray and gamma radiation gauges have been developed but are impractical to use due to the exceedingly hazardous nature inherent in handling these radiation gauges.

Due to the inherent slowness and inaccuracy of the above systems, considerable waste also occurs. In the case of beta gauges that are used on-line, the rate of change is so slow that a considerable amount of material can pass through the process before a change in the manufacturing process can be effected. For the other gauges used off-line, representative samples must be obtained. The stock rolls of polymer film often contain thousands of feet of film. Since only representative samples of each roll are measured, if a sample is bad, then the entire stock roll may be considered to be bad and thrown out even if only a small segment is actually bad. Of course, the converse may also be true where the representative sample is considered good but was taken between lengths of polymer film that are actually bad.

There currently does not exist an accurate method for on-line monitoring and control of the manufacturing process to minimize, if not eliminate, poorly manufactured polymer films or considerable waste in manufacturing adequate polymer films.

SUMMARY OF THE INVENTION

The present invention relates to a measuring device to be used for measuring the thickness of thin polymer film sheets or webs. Using an effective monochromatic light source, the inventive process is configured to provide high speed and accurate measurements of the thickness of the thin polymer film based on the relative absorption of light by the polymer film using Lambert's Law of absorption by homogenous materials.

In one embodiment of the present invention the high speed capabilities are used to advantage by providing continuous rapid readings of film thickness measurements during the manufacturing process. Such readings are used to effect a feedback control system to keep the manufacturing process within the parameters set for the manufacturing process. In this way, if the manufacturing process is trending towards producing film too thick or too thin, the control system will alter the process on-line to correct the trend. This embodiment will be capable of traversing the web from side to side while the web is moving ensuring not only adequate down-web measurements but also assessing thickness across the width of the web. This device is capable of self-zeroing and calibration by traversing periodically off-web and taking zeroing readings through an air sample and calibration readings through samples of known polymer film thickness.

Another embodiment of the present invention allows on-line caliper measurements of opalescent or translucent thin polymer films. Not all polymer films are transparent, but may also have scattering effects hence the opalescent or translucent appearance. Light scattering will affect light absorption measurement attempts in a non-linear fashion. The invention undertakes measurement of light absorption and light scattering and corrects for the changes in light absorption caused by light scattering to effect a calculated polymer film thickness.

A further embodiment of the present invention is configured to be used as a portable device that can be transported to multiple manufacturing lines. The device lends itself to rapid and easy setup. Through use of a modified light beam chopper, the device incorporates a single light detector to measure the intensity of the measuring light beam and reference light beam. This embodiment is readily zeroed and calibrated by moving the device off-line, then using an air sample and known polymer film thickness sample, and then easily moving the inventive device back to the manufacturing process.

BRIEF DESCRIPTION OF THE DRAWINGS

FIG. 1a is a system diagram of an embodiment of the invention for on-line use in the manufacturing process of polymer films.

FIG. 1b is a side view of the invention as embodied in FIG. 1a.

DETAILED DESCRIPTION OF THE PREFERRED EMBODIMENT

Figure 2:
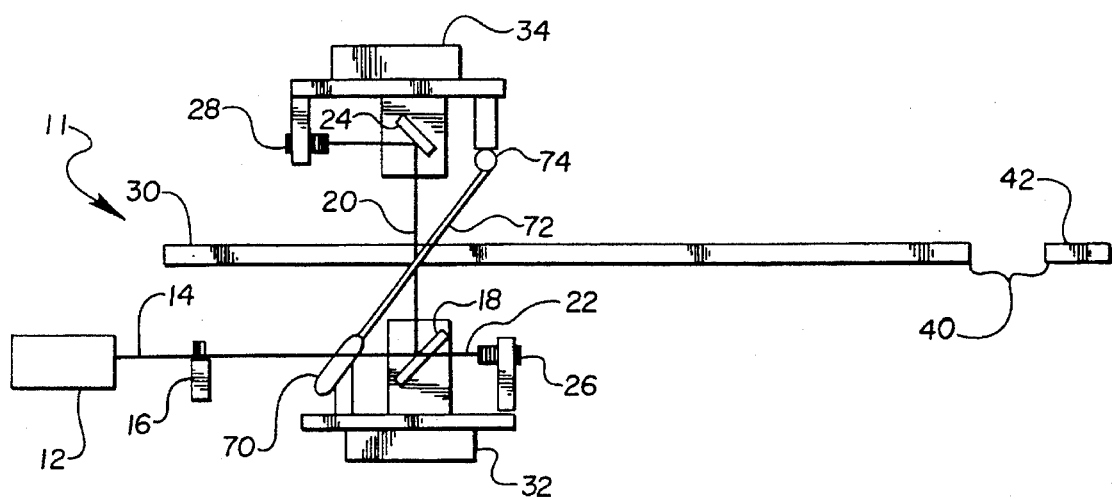
FIG. 2 is a side schematic view of another embodiment of the invention for on-line use in the manufacturing process.

The invention is a method and apparatus for measuring the thickness of materials. In a preferred embodiment, the invention is used during the manufacturing process for on-line measurements of product thickness, and the measurements are then used as a guide to control the manufacturing process by adjusting product thickness during the manufacture of thin polymer films. The invention is also capable of providing rapid spot measurements of a film's thickness, off-line, involving minimal set-up.

Referring to FIG. 1a, apparatus 10 comprises laser 12, beam chopper 16, beam splitter 18, mirror 24, and light detectors 26 and 28. The apparatus further comprises slaved linear motors 32 and 34, motor tracks 36 and 38, air sample 40, and a known polymer sample 42, which are mounted in apparatus frame 56. A computer subsystem 44 is connected to light detectors 26 and 28 and slaved linear motors 32 and 34 by cables 46 and 48 and also provides control to signal demodulator 50 and motor drives 52 and 54.

In operation, apparatus 10 is capable of on-line monitoring of the production process for manufacturing polymer films. Polymer film 30 is manufactured as a continuous sheet, or web, that is eventually collected onto stock rolls. Laser 12 emits an effective monochromatic light beam 14 having a wavelength of 3,390 nanometer (nm), the wavelength of absorption suitable for a polymer film 30 made from polyester. However, depending on the polymer film to be measured, different wavelength light may be used. In another example, polypropylene absorbs in the 2,390 nm wavelength region. A laser source is preferable because of the efficiency in producing adequate light intensity and because it is not necessary to focus a laser beam on polymer film 30. Polymer film 30 is moving as part of the manufacturing process and is subject to fluttering as it moves, and only light from a laser source is insensitive to the effects of fluttering. Additionally, helium-neon lasers have been shown to be efficient for use in an embodiment of the present invention.

Light beam 14 is chopped by beam chopper 16 at a known frequency, such as 1 KiloHertz (kHz). The result is to divide up beam 14 into discrete pulses of light. Synchronizing detection of these pulses of beam 14 reduces the influence of background and environment noise such as 60 Hertz (Hz) alternating current interference and room illumination. As depicted in FIG. 1, beam chopper 16 is a tuning fork chopper vibrating at 1 kHz. Light beam 14 is then split by beam splitter 18 constructed of zinc/selenide and oriented to reflect approximately 75% of light beam 14 into measuring beam 20 and transmit the remaining 25% of light beam 14 as reference beam 22. Reference beam 22 is directed to light detector 26 from which a reference intensity value is obtained. Measuring beam 20 is reflected by mirror 24 directing measuring beam 20 to light detector 28 from which a measuring intensity value is obtained. Taking the ratio of the reference and measuring intensity values provides a light intensity value, I, that is proportional to the measurement beam intensity, see equation 1 below. Using a ratio of the reference beam 22 intensity value through air with the simultaneous measuring beam 20 light intensity through polymer film 30 reduces noise coming from laser 12.

Zeroing of apparatus 10 is accomplished by obtaining a measuring and reference beam intensity ratio when measuring beam 20 passes through air gap 40. The ratio value for these two measurements gives the intensity value $I_0$, and serves as the zeroing intensity value in equation 1 below. This can be accomplished before placing polymer film 30 within apparatus 10. Alternatively, as is more practically accomplished in the present embodiment, using slaved linear motors 32 and 34 running on tracks 36 and 38, measuring beam 20 can be moved off the edge of polymer film 30 after polymer film 30 has been placed within apparatus 10. Once the zero measurement is obtained, measuring beam 20 is returned to pass through polymer film 30 to obtain the measuring beam intensity after absorption by polymer film 30.

Calibration of apparatus 10 is performed by measuring the intensity value after absorption by a known thickness such as polymer film sample 42. By solving for the zeroing intensity value through air and the intensity value through the known thickness, two points on a curve are established. The light frequency is chosen such as to provide as nearly linear a curve as possible so as to satisfy Lambert's Law as given in the following equation:

$$I/I_0 = e^{-\alpha t} \qquad \text{eq.1}$$

where intensity $I_0$ is the reference ratio or zero reading in this instance, for the readings taken off-web through the air; intensity I is the ratio of measuring beam 20 and reference beam 22 values obtained when measuring beam 20 is projecting through polymer film 30, e is the natural exponent, $\alpha$ is the absorption coefficient which does not vary with thickness but will change with different wavelengths of light used, and t is the thickness of the homogenous absorbing material. In this way, solving for the slope of the line between the zeroing value and the calibration value will solve for the constant $\alpha$ in equation 1. Recombining and solving for the thickness gives the following relationship:

$$t = (1/\alpha)\ln(I_0/I). \qquad \text{eq.2}$$

Since the value of a will not change for the wavelength of light used, calibration for determining $\alpha$ need not be repeated. However, apparatus 10 is capable of mounting polymer film sample 42 to the inside of frame 56 and aligned to be scanned each time measuring beam 20 is taken off web to zero through air gap 40. The value of t as measured by apparatus 10 can be used for evaluation against the manufacturing process parameters in a feedback fashion optimizing web thickness for the production parameters set.

FIG. 1b depicts a side view of apparatus 10 to provide perspective to the orientation of apparatus 10 and frame 56 in relation to moving polymer film 30. As shown in FIG. 1b, polymer film 30 is moving from roller 58 to roller 60 during the production process of polymer film 30. Therefore, in FIG. 1a, polymer film 30 is moving out of the plane of the paper. The orientation of frame 56 is such that measuring beam 20 will not be incident to the surface of polymer film 30 closer than approximately 5° to the normal of the plane of polymer film 30. This orientation minimizes any deleterious reflections of measuring beam 20 from the surface of polymer film 30.

Apparatus 10, as depicted in FIG. 1a, uses a chopper frequency of 1 kHz. Sampling of the intensity output values of light detectors 26 and 28 is synchronized with the chopper and acquires the intensity output signals from light detectors 26 and 28 at the same rate. Computer subsystem 44 averages ten consecutive readings giving a sampling rate of 100 measurements per second. In this embodiment, the laser beam diameter is approximately 0.83 millimeter (mm). Given reasonable polymer film 30 speed and data acquisition time, approximately 3.175 mm (i.e., ⅛ inch) polymer film 30 will pass through measuring beam 20 for each reading. With a web speed of 609.6 meters/minute (i.e., 2,000 ft/min.), 100 measurements occur over 10.16 meters (i.e., 33 ⅓ feet) of length of moving polymer film 30. This is roughly the equivalent of taking a measurement of the thickness of a 3.175 mm (i.e., ⅛ inch) sized piece of polymer film 30 approximately every 101.6 mm (i.e., four inches) along the length of the web.

Slaved linear motors 32 and 34 are used in the present invention. Other types of motors are belt driven or screw driven, but any slaved stepper motor arrangement is acceptable to ensure continuous proper alignment of the optics throughout the full range of motion. Slaved linear motors 32 and 34 are capable of traversing tracks 36 and 38 back and forth at a rate of 254 mm/second (i.e., 10 inches/second). The average stock roll of polymer film 30 is 1524 mm (i.e., 60 inches) wide. Therefore, apparatus 10 is capable of taking measuring beam 20 off web every six seconds, or after every 600 measurements to obtain zeroing and re-calibration measurements.

As stated above, the ratio of measuring beam 20 intensity with intensity reference beam 22 gives the thickness for the polymer film according to equation 1. For homogenous materials, light absorption follows Lambert's Law for the relationship of the material's thickness to the amount of light absorbed. Polymer films such as polyester are homogenous and in the case of polyester, absorb suitably in the 3,390 nm wavelength region. Not all polymer films are optically transparent, but instead are translucent owing to the presence within the polymer film of a physical or chemical characteristic that scatters the light.

Many translucent polymer films will not only absorb, but will simultaneously scatter light as well. Therefore, there is loss in intensity from absorption and loss of intensity due to scattering. However, the loss from each of these effects will have different slopes to the logarithmic linear relationships. If only absorption is measured, ignoring the effects of scattering, then a reading for thickness of a translucent polymer will return an abnormally thick value.

The effect of scattering also follows an exponential relationship similar to Lambert's Law represented in equation 1, but scattering is expressed by the following equation:

$$I'/I'_0 = e^{-\tau t} \qquad \text{eq.3}$$

where $\tau$ is the turbidity constant and $I'_0$ and $I'$ are the intensity value changes due to passing through a translucent substance.

Since the measured loss in intensity for some translucent films is secondary to absorption and scattering, then the individual contributions by absorption and scattering to the measured drop in intensity is a combination of equation 1 with equation 3 which yields the following:

$$(I/I_0) = (e^{-\tau t})(e^{-\alpha t}) \qquad \text{eq.4}$$

and solving for thickness t yields:

$$t = (1/(\alpha+\tau))\ln(I_0/I). \qquad \text{eq.5}$$

FIG. 2 depicts apparatus 11, an alternative embodiment for measuring webs that are translucent or opalescent owing to a light scattering effect within the web. Changes in optical clarity are caused in part by film surface imperfections, bulk particulates, or as an inherent characteristic of the polymer film itself, for example polypropylene. These light scattering effects are independent of absorption and in the case of surface imperfections are even independent of the film's thickness.

Apparatus 11 incorporates visible spectrum laser 70 emitting beam 72 aligned to intersect with measuring beam 20 at the level of polymer film 30. For polypropylene, laser 12 optimally has an output light wavelength of 2,390 nm. This wavelength is ideal for polypropylene because it provides a linear curve relationship for light absorption to thickness. The wavelength of laser 70 is chosen to have minimal absorption in the material that polymer film 30 is composed of, hence it will only measure the scattering effect of polymer film 30. For polypropylene, an ideal output wavelength for laser 70 has been in the visible light spectrum in the red region. Measuring beam 20, by comparison, will be affected by both the scattering and the absorption. Consequently, the thickness measurements obtained by measuring beam 20 will be inordinately large. By ratioing the output of detector 74 with the output values of detectors 26 and 28, as defined by equation 5, it is possible to calculate for and remove the scattering effect and only measure the absorption to arrive at a thickness value. The zeroing and re-calibration for apparatus 11 is similar as in apparatus 10 using an air sample found at air gap 40 and known thickness and scattering sample 42.

The use of laser 70 provides for on-line calculation of the constant $\tau$, allowing solution of equation 5. Solving equation 3 in terms of $\tau$ gives:

$$\tau = (1/t)\ln(I'_0/I') \qquad \text{eq.6}$$

Substituting equation 6 into equation 5 for the value of $\tau$ and solving for t yields:

$$t = (1/\alpha)\ln((I_0/I)(I'/I'_0)) \qquad \text{eq.7}$$

The use of appropriate samples including air will provide the necessary intermittent calibration of the system.

Figure 3:
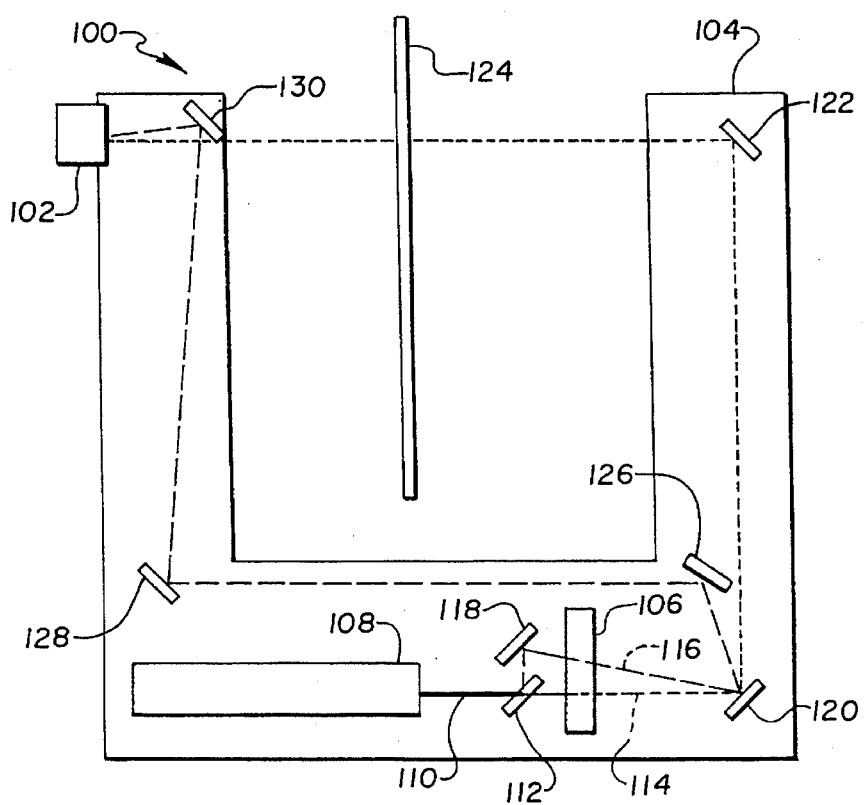
FIG. 3 is a plan view of another embodiment of the invention suitable for portable use among several manufacturing lines.

FIG. 3 depicts an embodiment identified as apparatus 100. Apparatus 100 is a simplification incorporating use of a single light detector 102. Apparatus 100 is designed to only measure in a down web direction. Frame 104 is an open ended, or "C" shaped frame to allow apparatus 100 to be slid over a moving web. Apparatus 100 is mobile in that it can be dollied from one production line to the next.

Figure 4A:
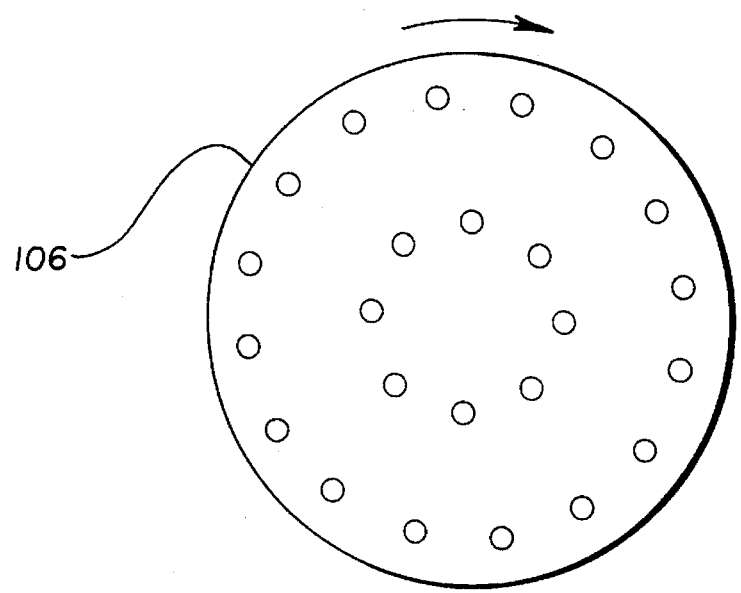
FIG. 4a is a front view of a modified light beam chopper as used in the invention.

Apparatus 100 makes use of a synchronized light beam chopper 106 and as depicted in FIG. 4a. As depicted, beam chopper 106 is a wheel with a plurality of holes. Preferably, beam chopper 106 has twenty four holes arranged in a pattern of sixteen holes in an outer circular array and eight holes in a circular array closer to the center. The holes are arranged such that there is no overlap of the inner holes to holes of the outer hole arrangement.

Figure 4B:
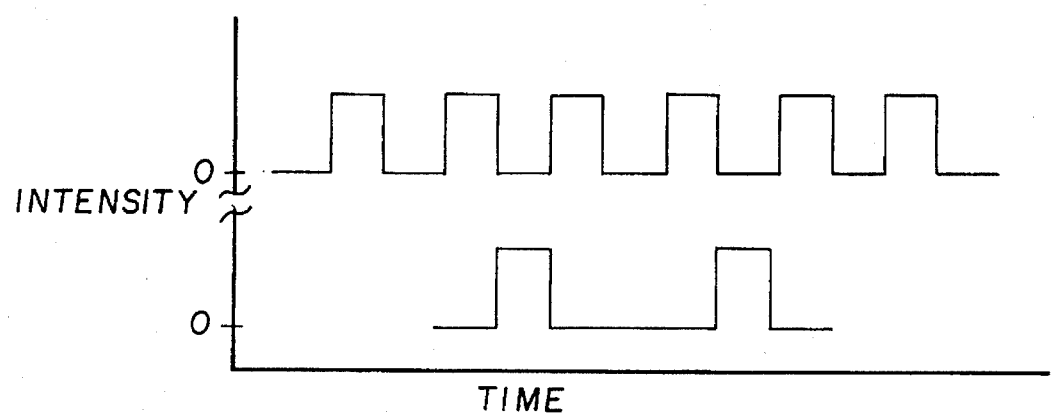
FIG. 4b is a graphic representation of the light intensity signal seen at the light detector as used in the invention.

A laser 108 provides a suitable source for a light beam 110 of appropriate wavelength for the polymer film to be measured by absorption. Light beam 110 is split by beam splitter 112, creating a measuring beam 114 and a reference beam 116. Measuring beam 114 is aligned to be incident with the outer ring of holes on chopper 106. As chopper 106 rotates, measuring beam 114 is pulsed sixteen times for each rotation of chopper 106. Mirror 118 is aligned to reflect reference beam 116 onto chopper 106 such that reference beam 116 will be incident with the inner ring of holes contained within chopper 106. In this fashion reference beam 116 is pulsed eight times for each revolution of chopper 116. The arrangement of the holes within chopper 116 is such that light detector 102 will receive two pulses from measuring beam 114 then one reference beam 116 pulse then the pattern repeats as depicted in FIG. 4b with the vertical axis corresponding to intensity and the horizontal axis corresponding to time.

From chopper 106, measuring beam 114 is reflected in sequence by mirrors 120 and 122 such that measuring beam 114 traverses across from one arm of frame 104 to the other arm and is incident on light detector 102. Frame 104 is placed over a moving polymer film 124 aligned to have measuring beam 114 transit polymer film 124 at an appropriate angle of incidence no less than 5° to the normal of the plane of polymer film 124. From chopper 106, reference beam 116 is reflected in sequence by mirrors 120, 126, 128, and 130 such that reference beam 116 traverses around frame 104 and is incident on light detector 102 having only encountered air.

As in apparatus 10, apparatus 100 ratios the intensity values from detector 102 for measuring beam 114 and reference beam 116 to arrive at a value I. $I_0$ and $\alpha$ are obtained off-line by measuring an air sample and a known thickness polymer film sample.

We claim:

1. A high speed, high resolution solid film measuring apparatus comprising:

radiant energy source means for providing both a first beam of coherent monochromatic light affected by absorption and scattering effects of the solid film and a second measuring beam of coherent monochromatic light affected only by the scattering effect of the solid film;

beam splitting means for splitting the first beam of coherent monochromatic light into a reference beam and a first measuring beam, the reference beam passing through air;

means for passing the first measuring beam and the second measuring beam through substantially the same position on the solid film;

detection means for detecting the reference beam, the first measuring beam, and the second measuring beam to obtain beam intensity values;

first comparator means for comparing the beam intensity value of the first measuring beam to the reference beam to obtain an intermediary value representative of the effects of absorption and scattering; and second comparator means for comparing the intermediary value to the second measuring beam intensity value to eliminate the effect of scattering to obtain an absorption value that is proportional to the thickness of the solid film.

2. The apparatus of claim 1 further comprising chopping means for chopping the first beam of coherent monochromatic radiant energy.

3. The apparatus of claim 1 in which the solid film being measured is stationary during off-line measurements during the film manufacturing process, and in which the solid film being measured is moving during on-line measurements during the film manufacturing process.

4. The apparatus of claim 1 further comprising traverse means for moving the first and second measuring beams transversely back and forth across the width of the moving solid film.

5. The apparatus of claim 1 further comprising calibration means for taking the first measuring beam and the second measuring beam off of the moving solid film for calibrating the first measuring beam and the second measuring beam through an air sample.

6. The apparatus of claim 5 in which the calibration means comprises means for calibrating the first measuring beam and the second measuring beam through a sample polymer film of known thickness.

7. The apparatus of claim 1 further comprising feedback control means during the manufacturing process for using the thickness value obtained on-line to control the thickness of the moving solid film during the manufacturing process.

8. The apparatus of claim 1 in which the angle of incidence of the measuring beam is at least a minimum of 5° to the normal of the plane of the moving polymer film.

9. A method for measuring a moving film during the manufacturing process, the process comprising the steps of:

providing a first coherent monochromatic energy beam;

providing a second coherent monochromatic energy beam;

splitting the first monochromatic energy beam into a reference beam and a first measuring beam;

passing the first measuring beam through the solid film;

passing the second coherent monochromatic energy beam through the solid film at substantially the same position as the first measuring beam;

detecting the first measuring beam, the second monochromatic energy beam and the first reference beam; and calculating a value proportional to the intensities detected of the first measuring beam, the second coherent monochromatic energy beam and the reference beam to determine the thickness of the moving film.

10. The method of claim 9 in which the step of calculating comprises the steps of:

performing a first ratio of the intensity values proportional to the detected first measuring beam in relation to the first reference beam;

performing a second ratio of the intensity values proportional to the detected second coherent monochromatic energy beam; and computing a thickness value for the solid film from the first and second ratios.

11. The method of claim 9 further comprising the step of orienting the axis of the first measuring beam at least 5° to the normal of the plane of the solid film.

12. The method of claim 9 further comprising the step of controlling the manufacturing process using the thickness value of the moving film.

13. The method of claim 9 further comprising the step of traversing the first measuring beam and the second coherent monochromatic energy beam back and forth across the moving film.

14. The method of claim 13 further comprising the step of calibrating the first measuring beam in relation to the reference beam and calibrating the second monochromatic energy beam by periodically moving the first measuring beam and the second coherent monochromatic energy beam off of the moving film and onto an air gap.

15. The method of claim 13 further comprising the step of calibrating the first measuring beam in relation to the reference beam and calibrating the second monochromatic energy beam by periodically moving the first measuring beam and the second coherent monochromatic energy beam off of the moving film and onto at least one known solid film sample.

16. The method of claim 9 in which the step of calculating the thickness of the moving web comprises using Lambert's Law $I=I_0 e^{-\alpha}$; wherein I is the ratio of the measuring beam and reference beam, $I_0$ is the reference ratio, $\alpha$ is the calibration constant and t is the thickness, on the proportional intensity values of the reference beam and the first measuring beam and using a modified Lambert's law for scattering on the second coherent monochromatic energy beam.

17. The method of claim 9 in which the step of calculating the thickness of the moving web comprises using the equation $t=(1/\infty)\ln((I_0 I)(I'/I'_0))$; wherein $I$ is the ratio of the measuring beam and reference beam $I_0$ is the reference ratio, $I'$ and $I'_0$ are the intensity value changes due to passing through a translucent substance, $\infty$ is the calibration constant and t is the thickness, on the proportional intensity values of the reference beam, the first measuring beam and the second coherent monochromatic energy beam.

18. The method of claim 9 further comprising the step of chopping the coherent monochromatic radiant energy beams.

* * * * *

UNITED STATES PATENT AND TRADEMARK OFFICE
CERTIFICATE OF CORRECTION

PATENT NO. : 5,506,407
DATED : April 9, 1996
INVENTOR(S) : John S. Huizinga, John J. Costello III It is certified that error appears in the above-indentified patent and that said Letters Patent is hereby corrected as shown below:

Col. 4, line 41, after "value of", change "a" to --α--;

Signed and Sealed this

Eighteenth Day of February, 1997

Attest:

BRUCE LEHMAN

*Attesting Officer*  *Commissioner of Patents and Trademarks*